United States Patent [19]

Kondo

[11] Patent Number: 4,977,467
[45] Date of Patent: Dec. 11, 1990

[54] MAGNETIC TAPE HIGH-SPEED BRAKING APPARATUS

[75] Inventor: Yuji Kondo, Fukaya, Japan

[73] Assignee: Kabushiki Kaisha Toshiba, Kawasaki, Japan

[21] Appl. No.: 330,283

[22] Filed: Mar. 29, 1989

[30] Foreign Application Priority Data

Mar. 30, 1988 [JP] Japan ................... 63-74412

[51] Int. Cl.$^5$ ............................................. G11B 15/48
[52] U.S. Cl. ................................ 360/74.1; 360/137; 360/74.4; 242/204
[58] Field of Search .................. 360/74.1, 74.4, 74.5, 360/72.2, 72.3, 96.3, 96.5, 96.1, 137, 69, 90, 92, 85, 95, 73.01; 242/204, 156.2

[56] References Cited

U.S. PATENT DOCUMENTS

| | | | |
|---|---|---|---|
| 4,500,049 | 2/1985 | Sugihara | 360/74.2 |
| 4,807,061 | 2/1989 | Yoon | 360/74.1 X |
| 4,899,951 | 2/1990 | Okada et al. | 360/74.1 |

Primary Examiner—John H. Wolff
Assistant Examiner—Alfonso Garcia
Attorney, Agent, or Firm—Cushman, Darby & Cushman

[57] ABSTRACT

According to a magnetic tape high-speed braking apparatus, a cam groove for setting various operation modes is formed in a cam gear. A high-speed mode such as a high-speed search is set on the cam gear at that portion thereof which corresponds to an end portion of a loading state. When a loading motor rotates in a predetermined loading direction, a worm gear is rotated in a first direction via pulleys, a belt and gears. In high-speed search mode, a cam pin of a cam lever engaged with the cam gear is fixed to a recess of a rotatable lock lever. When a tape end is detected and the cam gear rotates in a direction opposite to the first direction, the cam pin is separated from the recess by a projection of worm gear member, a lock release lever and a spring. Accordingly, the cam lever, a brake connector, a brake switching lever and a brake slider are actuated to press brake shoes of main brakes abutting on the brake slider, against a feed reel stand and a take-up reel stand, thereby instantaneously braking these reel stands.

20 Claims, 4 Drawing Sheets

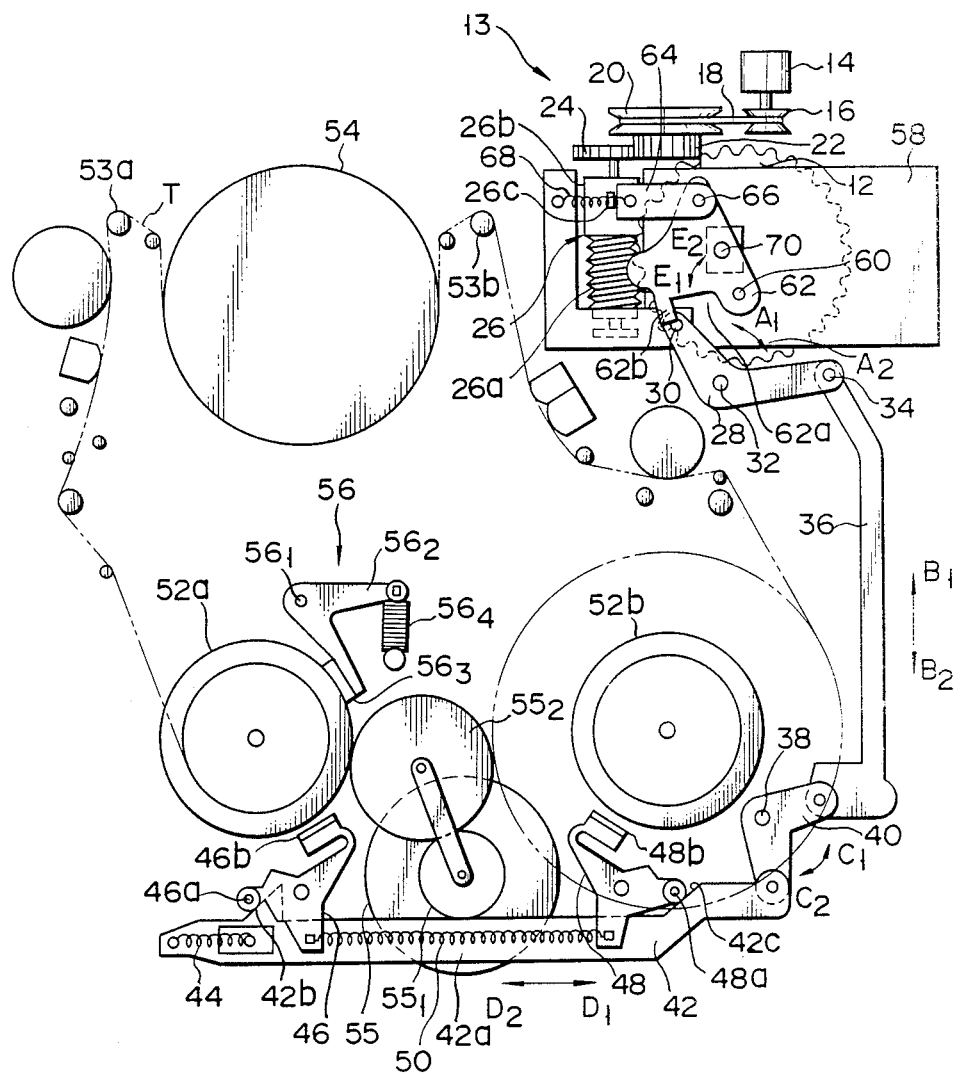
F I G. 1

MAGNETIC TAPE HIGH-SPEED BRAKING APPARATUS

BACKGROUND OF THE INVENTION

1. Field of the Invention

The present invention relates to a magnetic tape high-speed braking apparatus and, more particularly, to a magnetic tape high-speed braking apparatus which can brake a magnetic tape running at a high speed in a magnetic recording/reproducing apparatus such as a video tape recorder.

2. Description of the Related Art

For magnetic recording/reproducing apparatuses employing a magnetic tape, such as video tape recorders (hereinafter referred to as VTR or VTRs), a so-called full loading system has been developed which winds a magnetic tape, wound around a reel, around a cylinder to initiate the entire operation in high-speed mode as in recording/reproducing mode. In a VTR of this full loading system, a brake mechanism for detecting a tape end to initiate braking in high-speed mode, such as fast-forward (hereinafter referred to as FF) or rewinding (hereinafter referred to as REW) mode, is generally constituted as follows.

A predetermined cam pattern for setting the operation mode, such as the aforementioned FF or REW, recording, playback or stop, is formed as a cam groove in a cam gear. A cam lever is engaged at its one end in the cam groove so as to be movable along the grooves. When an tape end detector detects the tape end, the cam lever is moved by rotating the cam gear to a predetermined position for the stop mode. Setting the cam lever in stop mode applies braking on the rotation of a cylinder or on the running of the magnetic tape. Accordingly, this braking mechanism requires a predetermined braking time for rotating the cam gear until braking is applied to a reel stand on which the afore-mentioned reel is mounted, after detection of the tape end. As the magnetic tape gets closer to the tape end, the running speed of the tape is slowed down.

However, decelerating the magnetic tape near the tape end inevitably increases the tape winding time and makes this braking mechanism inapplicable to a high-speed VISS (VHS Index Search System) or the like.

With the capstan drive in use, the inertia drive by a capstan motor should be instantaneously stopped in order to stop the magnetic tape with a high responsibility after detection of the tape end.

SUMMARY OF THE INVENTION

Accordingly, it is an object of this invention to provide a magnetic tape high-speed braking apparatus which can apply high-speed braking to a magnetic tape running, wound around a reel, at a high speed in a magnetic recording/reproducing apparatus.

According to one aspect of this invention, there is provided a magnetic tape high-speed braking apparatus comprising tape running drive means including reel stand for rotating a reel, around which a tape is wound, in a predetermined direction, brake means for braking the reel stand, movable operation mode selecting means having a plurality of independent and successive cams for selecting at least a high-speed mode, a stop mode and a normal-speed mode for the tape, brake control means, which causes the brake means to be engaged with the cams of the operation mode selecting means, for controlling whether to brake or release the reel stand in accordance with the mode, operation mode setting means for driving the operation mode selecting means and setting an operation mode, discriminating means for discriminating a running state of the tape and detecting a state in which the tape is to be stopped, a lock member, which is driven by the movement of the operation mode setting means due to the setting of the high-speed mode, for locking the brake control means in a brake release position, drive means for driving the operation mode selecting means when the discriminating means detects the state in which the tape is to be stopped, and brake instantaneous drive means having a lock release member, which is controlled by the movement of the operation mode selecting means, for releasing the brake control means locked by the lock member, thereby braking the reel stand by the brake means.

According to another aspect of this invention, there is provide a magnetic tape high-speed braking apparatus comprising tape running drive means including reel stand for rotating a reel, around which a tape is wound, in a predetermined direction, a brake member for braking the reel stand, rotatable cam gear means including a first and a second cam patterns having a plurality of independent and successive cams for setting at least a high-speed mode, a stop mode and a normal-speed mode for the tape, brake control means, which causes the brake member to be engaged with the first cam pattern of the cam gear means, for controlling whether to brake or release the reel stand in accordance with the modes, operation mode setting means for driving the cam gear means and setting an operation mode, discriminating means for discriminating a running state of the tape and detecting a state in which the tape is to be stopped, a lock member having an engaging section which is engaged with the second cam pattern of the cam gear means and driven by the rotation of the cam gear means due to the setting of the high-speed mode, for locking the brake control means in a brake release position, drive means for driving the cam gear means when the discriminating means detects the state in which the tape is to be stopped, and a lock release member, which is controlled by the rotation of the cam gear means, for releasing the brake control means locked by the lock member, thereby braking the reel stand by the brake means.

BRIEF DESCRIPTION OF THE DRAWINGS

These and other features and advantages of this invention will become more apparent from the following detailed description of an exemplary embodiment as illustrated in the accompanying drawings in which:

FIG. 1 is a plan view illustrating a magnetic tape high-speed braking apparatus according to one embodiment of this invention;

DETAILED DESCRIPTION OF THE PREFERRED EMBODIMENT

A magnetic tape high-speed braking apparatus according to a preferred embodiment of this invention will now be described referring to the accompanying drawings.

Figure 2:
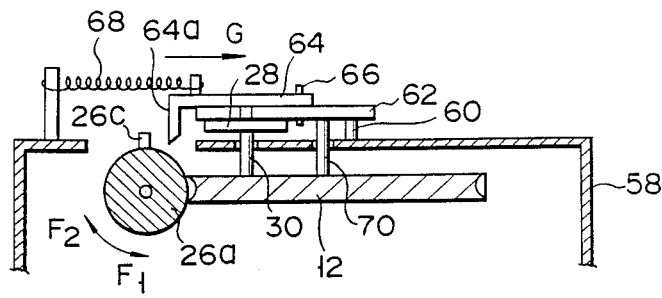
FIG. 2 is a lateral cross-sectional view of the essential section of the apparatus shown in FIG. 1.

FIGS. 1 and 2 are respectively a plan view and a cross-sectional view illustrating the essential section of a reel stand driving mechanism of a VTR to which this invention is applied. Referring to these diagrams, a rotation of a loading motor 14 is transmitted to a cam gear 12 for setting various modes for running a tape by means of a drive-force transmitting mechanism 13. This mechanism 13 comprises a pulley 16, a belt 18, a pulley 20, gears 22 and 24, and a worm gear member 26. The cam gear 12 engages a worm gear 26a of the worm gear member 26 and receives the rotational momentum of the loading motor 14. The worm gear member 26 comprises the worm gear 26a, which is directly engaged with the cam gear 12, and a cylinder section 26b disposed concentrical to this worm gear 26a. Cam grooves (to be described later) are formed in the cam gear 12, and a cam pin 30 provided at one end of a cam lever 28 is slidably engaged in the grooves. The cam lever 28 is mounted on a main base chassis (not shown) rotatable in the directions of the arrows $A_1$ and $A_2$ around a support shaft 32.

The cam lever 28 has a projection 34 provided at the other end thereof, and is coupled to one end of a brake connector 36 via the projection 34; the brake connector 36 is slidable in the directions of the arrows $B_1$ and $B_2$. The brake connector 36 has the other end coupled to one end of a brake switching lever 40 which is rotatable in the directions of the arrows $C_1$ and $C_2$ around a support shaft 38. The brake switching lever 40 has the other end coupled to one end of a brake slider 42. This brake slider 42 has a substantially linear body 42a at the center portion and is supported, on the main base chassis, slidable in the longitudinal directions (the directions of the arrows $D_1$ and $D_2$) of the body 42a. A first spring 44 having one end secured to the main base chassis is coupled to the other end of the brake slider 42. Slanted sections 42b and 42c are formed respectively at proximities of both ends of the body 42a of the brake slider 42. A roller 46a of a main brake 46 disposed on the side of a supply reel and a roller 48a of a main brake 48 on the side of a take-up reel abut respectively on the slanted sections 42b and 42c. A second spring 50 is disposed above the body 42a of the brake slider 42, bridging between the main brakes 46 and 48, and presses the rollers 46a and 48a against the slanted sections 42b and 42c.

At free ends of the main brakes 46 and 48, brake shoes 46b and 48b are respectively provided, which abut on the outer surfaces of a supply reel stand 52a and a take-up reel stand 52b to apply braking. A supply reel and a take-up reel (neither illustrated) are detachably mounted on the reel stands 52a and 52b, respectively. A magnetic tape T has one end wound around the supply reel; the other end of the tape T is pulled out, passing along a predetermined path, by tape guides 53a and 53b and is wound around a cylinder 54 mounted with a magnetic head. Accordingly, the magnetic tape T is wound around the take-up reel in the so-called full loading system.

The supply reel stand 52a and take-up reel stand 52b receive a predetermined rotating force from a reel motor 55 through a motor pulley $55_1$ by means of an oscillating gear $55_2$. The oscillating gear $55_2$ is selectively engaged with either reel stand 52a and 52b in accordance with its rotating direction to transmit the rotating force.

A soft brake 56 is provided on the reel stand on the driven side to apply a predetermined amount of tension or more to the tape T in high-speed mode (to be described later) to thereby prevent a winding slack of the magnetic tape T. The soft brake 56 comprises a brake lever $56_2$ rotatably supported on a support shaft $56_1$, a brake shoe $56_3$ which abuts on the outer surface of the reel stand on the driven side (the supply reel stand 52a in FIG. 1) provided at one end of the brake lever $56_2$, and a third spring $56_4$, which is mounted on the other end of the brake lever $56_2$ and presses the brake shoe $56_3$ against the outer surface of the reel stand 52a.

A support plate 58 is provided above the cam gear 12 in the axial direction. A lock lever 62 is supported via a support shaft 60 on the support plate 58, rotatable in the directions of the arrows $E_1$ and $E_2$. One end of a lock release lever 64 of, for example, a substantially L shape is rotatably coupled via shaft 66 to one end of the lock lever 62. A fourth spring 68 having one end secured to the support plate 58 is attached at the other end to the other end of the lock release lever 64. The fourth spring 68 urges, via the lock release lever 64, the lock lever 62 to rotate in the direction of the arrow $E_1$. A recess 62a is formed in that portion of the lock lever 62 which is close to the support shaft 60. The cam pin 30 provided at the free end of the cam lever 28 is movable along the recess 62a. A projection 62b is formed at the proximity of the recess 62a of the lock lever 62 on the opposite side to the support shaft 60, and a cam pin 70, which engages cam grooves (to be described later) formed in the cam gear 12, is attached at the proximity of the center portion of the lock lever 62.

A projection 26c (one in FIG. 2, for example) is provided at the outer surface of the cylinder section 26b of the worm gear member 26, and it is engageable to a bent portion 64a formed at the free end of the lock release lever 64. The lock release lever 64 is made of a flexible member (e.g., plastic) which can be deformed in the width direction of the shaft 66 (in the vertical direction in FIG. 2) with the shaft 66 as a fulcrum. When the worm gear member 26 rotates in the direction of the arrow $F_1$, the projection 26c pushes the lock release lever 64 upward, passing by the lever 64. When the worm gear member 26 rotates in the direction of the arrow $F_2$, however, the projection 26c pushes the bent portion 64a in the right direction in FIG. 2 to move the lock release lever 64 in the direction of the arrow G.

Figure 3:
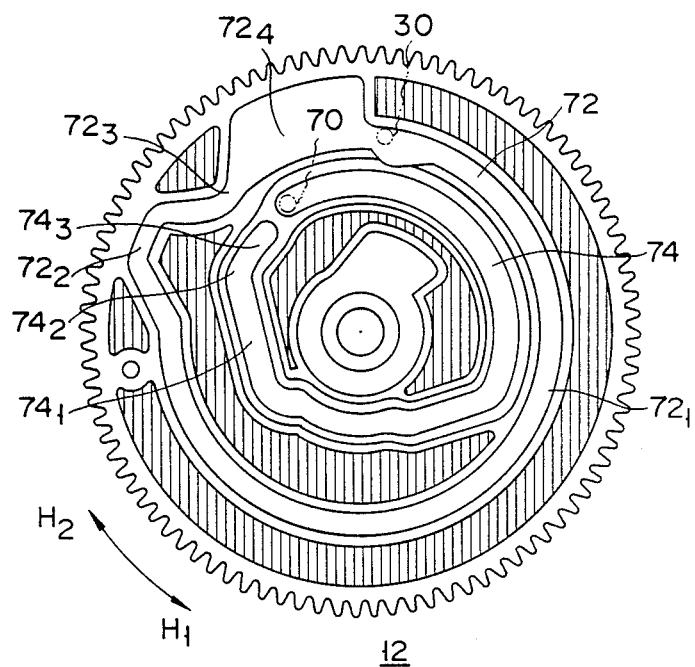
FIG. 3 is a plan view of a cam gear shown in FIG. 1 for explaining the operation thereof.

FIG. 3 illustrates the cam grooves formed in the aforementioned cam gear 12; a first groove 72 along which the cam pin 30 moves and a second groove 74 along which a cam pin 70 moves, are as illustrated.

Figure 4:
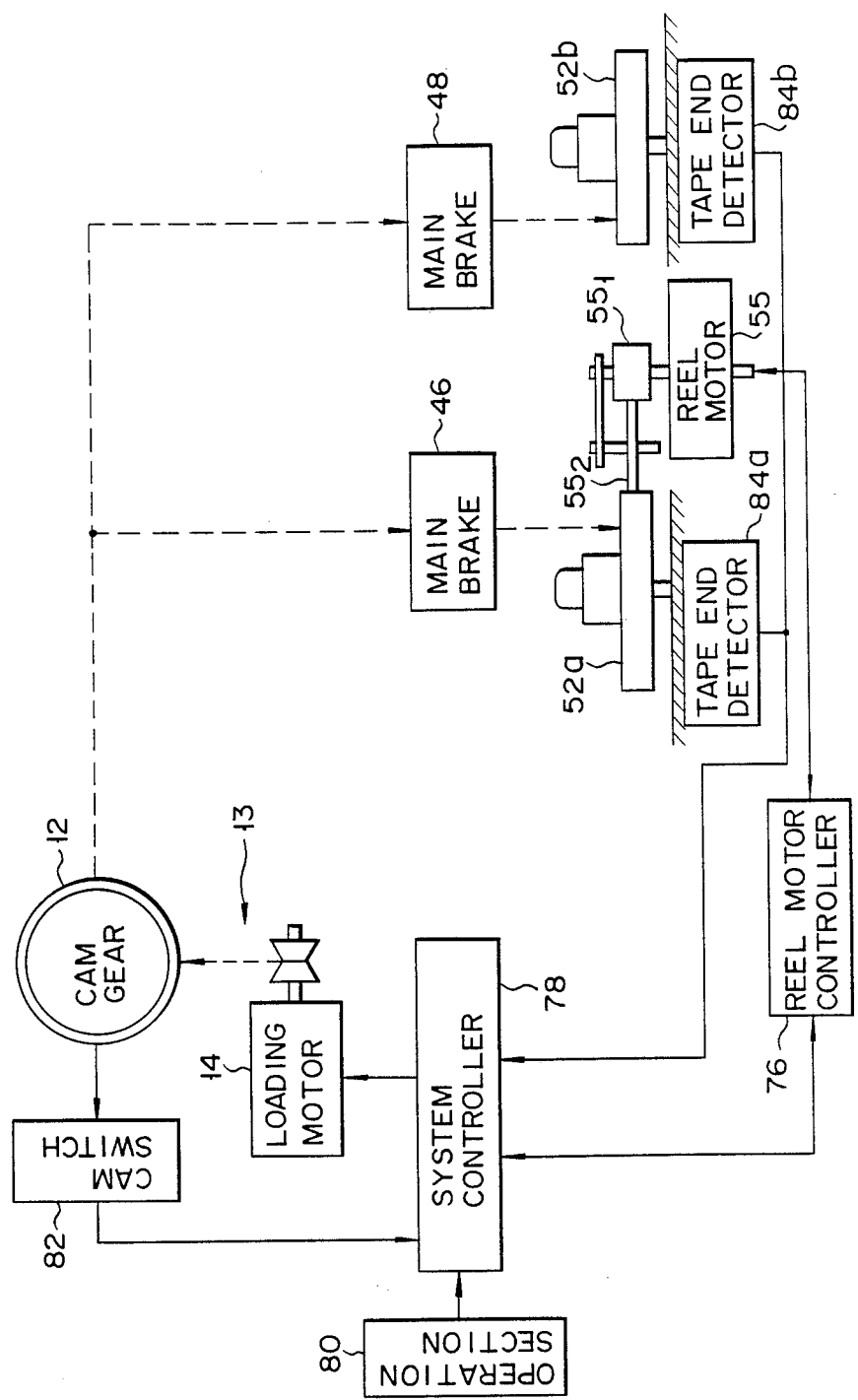
FIG. 4 is a block diagram illustrating a control system of the same embodiment.

FIG. 4 is a block diagram of a control system.

A reel motor 55 is controlled through reel motor controller 76 by a system controller 78. This system controller 78 receives a set signal from an operation section 80 and a select signal, which represents an operation mode according to first and second grooves 72 and 74 of cam gear 12, from a cam switch 82 and controls the loading motor 14 and the drive-force transmitting mechanism 13 in order to rotate to desired mode position the cam gear 12 for setting the aforementioned various operation modes necessary for a VTR machine. The mode select signal is for selecting modes associated with the first and second cam grooves 72 and 74 of the cam gear 12.

The supply reel stand 52a and take-up reel stand 52b respectively receive the rotational momentum of the reel motor 55 through a motor pulley $55_1$ and a rocking gear 55₂. Disposed at proximities of these reel stands 52a and 52b are tape end detectors 84a and 84b each comprising a pulse generator, a counter, etc. The tape end detector 84a and 84b are designed to count the number of pulses generated from, for example, the pulse generators, and detect the amount of the tape T remaining on the reels of the individual reel stands 52a and 52b, i.e., to detect the tape end, based on the number of the pulses counted. Detection signals are supplied to the system controller 78 from the tape end detector 84a and 84b. In accordance with the detection signals, the system controller 78 controls the main brakes 46 and 48 through the loading motor 14, drive-force transmitting mechanism 13 and cam gear 12 to thereby brake the reel stands 52a and 52b.

Figure 5:
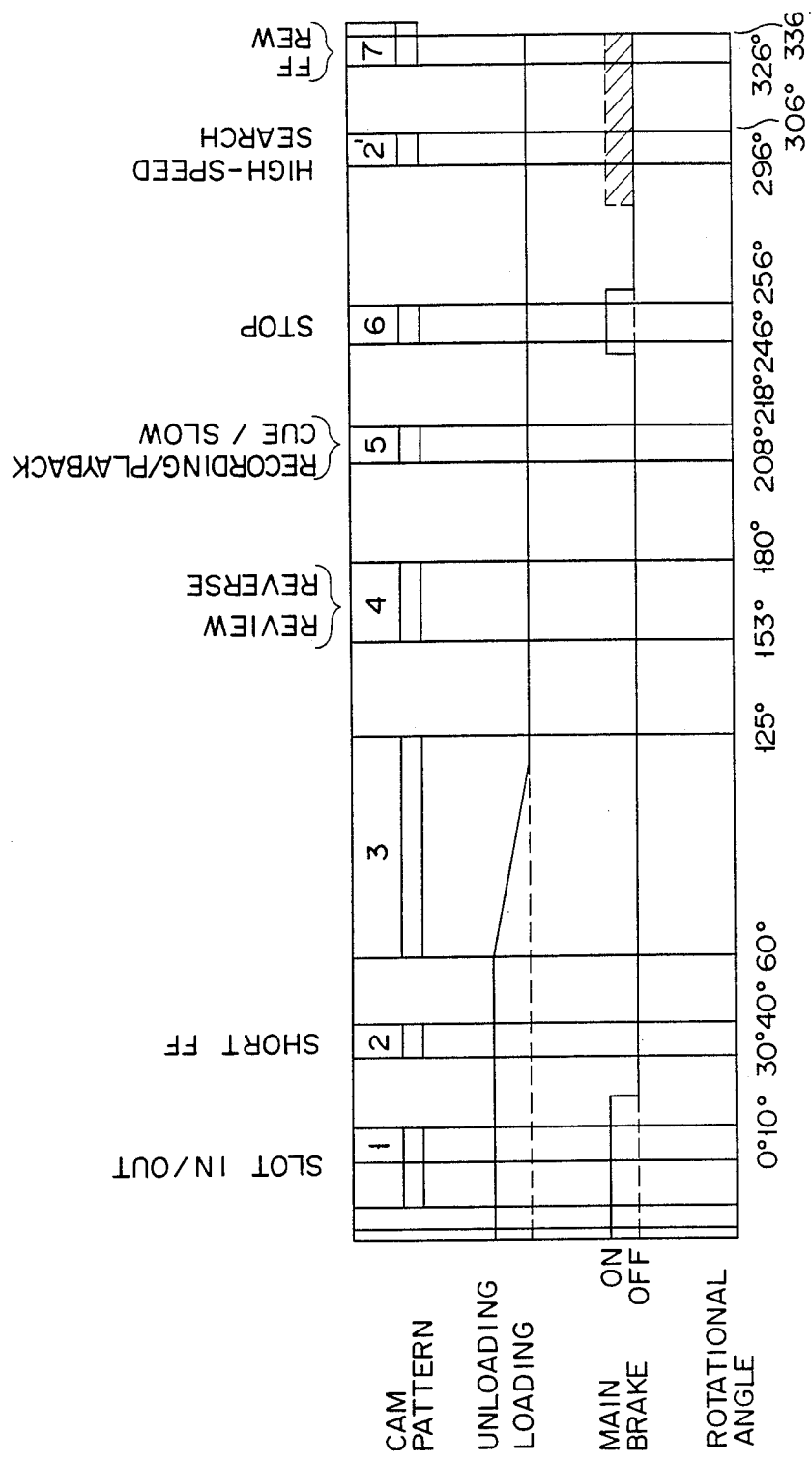
FIG. 5 is a timing chart for a cam according to this embodiment.

The operation of this embodiment will now be described referring to the timing chart shown in FIG. 5.

Assume that a VTR tape cassette is loaded in a VTR machine in a cassette loadable state. At this time, the cam gear 12 is set in a slot in/out state of a VTR tape cassette and a tape is in an unloading state, which is a cam pattern 1 shown in FIG. 5, and the main brakes 46 and 48 are in operable state. When the system controller 78 sends a drive command to the loading motor 14 upon reception of a set signal from the operation section 80, the loading motor 14 is driven to actuate the drive-force transmitting mechanism 13 to rotate the worm gear 26a in the direction of the arrow $F_1$ in FIG. 2. Consequently, the driving force of the loading motor 14 is transmitted to the cam gear 12 through the gears 22 and 24 and worm gear 26a. Then, the cam gear 12 starts rotating in the direction of the arrow $H_1$ in FIG. 3 and the cam pin 30 of the cam lever 28 moves along the first groove 72 so as to set the mode to the short fast-forward state of the cam pattern 2 and further to the loading state of the cam pattern 3 in accordance with the setting of the operation section 80. Based on the cam pattern 3, the tape T wound around the reels mounted on the supply reel stand 52a and take-up reel stand 52b is fed-out by the tape guides 53a and 53b. After passing by a predetermined path, the fed-out tape T is wound around the cylinder 54 having the magnetic head, and the tape cassette is now in loaded state.

When the loading motor 14 is driven to further rotate the cam gear 12 via drive-force transmitting mechanism 13 under the control of the system controller 78 through the operation of the operation section 80, the cam pin 30 moves along the first groove 72 to set the mode to a review or reverse mode by the cam pattern 4 or a playback, record, cue or slow mode by the cam pattern 5. Changing the cam patterns of the cam gear 12 actuates the cam switch 82 to send a mode select signal associated with each operation mode to the system controller 78. Upon reception of this signal, the system controller 78 detects that the drive-force transmitting mechanism 13 is switched to a mode set by the operation section 80 and sets an electric circuit in the mode. For example, system controller 78 controls the reel motor controller 76 to drive the reel motor 55 for rotating the reel stand 52a or 52b at a speed according to the selected mode.

In the modes specified by the cam patterns 2 to 5, the first small-diameter portion 72₁ of the first groove 72 of the cam gear 12 has the same diameter. In each of the above modes, therefore, the cam pin 30 stays abutting on the projection 62b of the lock lever 62. As a result, the cam lever 28, brake connector 36, brake switching lever 40 and brake slider 42 are pulled in the directions of the arrows $A_2$, $B_2$, $C_2$ and $D_2$, respectively. In other words, in the modes of the cam patterns 2 to 5, the rollers 46a and 48a of the main brakes 46 and 48 are in abutment with the slanted sections 42b and 42c of the brake slider 42, respectively. Accordingly, the brake shoes 46b and 48b of the main brakes 46 and 48 are separated from the outer surfaces of the supply reel stand 52a and take-up reel stand 52b, thus inhibiting the main brake mechanism from being driven.

When the system controller 78 receives the set signal from the operation section 80 which is associated with the stop mode indicated by the cam pattern 6, it causes the cam pin 30 of the cam lever 28 to come to the position for the stop mode. Then, the mode select signal is output to the system controller 78 from the cam switch 82. Upon reception of this signal, the controller 78 stops the loading motor 14 to stop rotating the cam gear 12. At this time, the system controller 78 is permitting the reel motor controller 76 to stop the reel motor. At the same time, the stop mode causes the main brake mechanism to be driven to actuate the main brakes 46 and 48.

In other words, the cam pin 30 of the cam lever 28 is positioned at a first large-diameter portion 72₂ of the first groove 72 as shown in FIG. 3. Therefore, the cam lever 28 rotates in the direction of the arrow $A_1$ around the support shaft 32. As a result, the brake connector 36 slides in the direction of the arrow $B_1$, the brake switching lever 40 rotates in the direction of the arrow $C_1$ and brake slider 42 slides in the direction of the arrow $D_1$. Accordingly, the rollers 46a and 48a of the main brakes 46 and 48, which are in abutment with the slanted sections 42b and 42c, come to the linear portions of the end portion and body 42a of the brake slider 42. As a result, the second spring 50 causes the main brake 46 to rotate in the counterclockwise direction in FIG. 1 while causing the main brake 48 to rotate clockwise. This presses the brake shoes 46b and 48b against the reel stands 52a and 52b to thereby apply braking thereto.

When the stop mode specified by the cam pattern 6 is changed to the high-speed search mode specified by the cam pattern 2' by the operation section 80, the system controller 78 drives the loading motor 14 again. This causes the cam gear 12 to rotate via the drive-force transmitting mechanism 13 such as the worm gear 26a, thus releasing the main brakes 46 and 48. That is, the cam pin 30 of the cam lever 28 comes to a second small-diameter portion 72₃ of the first groove 72 of the cam gear 12 as shown in FIG. 3. This causes the cam lever 28 to rotate in the direction of the arrow $A_2$ again. Accordingly, the brake connector 36 is moved in the direction of the arrow $B_2$ and the brake switching lever 40 rotates in the direction of the arrow $C_2$. Consequently, the brake slider 42 slides in the direction of the arrow $D_2$, thus causing the rollers 46a and 48a of the main brakes 46 and 48 to move over the slanted section 42b and 42c of the brake slider 42 again. Then, the brake shoes 46b and 48b are respectively separated from the outer surfaces of the reel stands 52a and 52b, thus releasing the braking. At the same time, the system controller 78 controls the reel motor controller 76 to drive the reel motor 55 to rotate the desired reel stand 52a or 52b.

At this time, the cam pin 70 of the lock lever 62 which are moving along the second cam groove 74 of the cam gear 12 comes in abutment with a diameter portion 74₁ of the second cam groove 74 and the lock lever 62 rotates in the direction of the arrow $E_2$ around the support shaft 60. This causes the cam pin 30 of the cam lever 28 to come to the recess 62a of the lock lever 62. When the cam gear 12 further rotates in the direction of the arrow H₁, the cam pin 70 of the lock lever 62 comes to a diameter portion 74₂ which is a bent portion of the second cam groove 74. As a result, the lock lever 62 again rotates in the direction of the arrow E₁. Accordingly, the cam pin 30 of the cam lever 28 is locked within the recess 62a so as to be hooked at the projection 62b of the lock lever 62.

When the cam gear 12 further rotates in the direction of the arrow H₁, the cam pin 30 comes to the large-diameter portion 72₄ of the first cam groove 72. Since the cam pin 30 is locked within the recess 62a of the lock lever 62, however, the cam lever 28, brake connector 36, brake switching lever 40 and brake slider 42 are in a state where no braking is effected, as in the aforementioned case where the cam pin 30 is located at the second small-diameter portion 72₃. Although the cam pin 70 is located at the diameter portion 74₁ of the second cam groove 74 at this time, the lock of the cam lever 28 will not be released by the help of the fourth spring 68 provided between the lock release lever 64 and support plate 58.

Even if the cam gear 12 is further rotated in the same direction through the operation of the operation section 80 in order to change the mode to the FF/REW mode specified by the cam pattern 7 from the high-speed search mode of cam pattern 2', the cam lever 28 remains locked.

Assume now that a tape end signal or a stop signal is detected in FF/REW mode by the tape end detectors 84a and 84b provided at the proximity of the reel stands 52a and 52b. The detected signal is supplied to the system controller 78 which in turn causes the loading motor 14 to rotate in an unloading direction that is opposite to the direction of the previous rotation. As a result, the drive-force transmitting mechanism 13 is driven in the reverse direction and the worm gear 26a rotates in the direction of the arrow F₂ (FIG. 2). Accordingly, the projection 26c provided at the cylinder section 26b pushes the bent portion 64a of the lock release lever 64 in the direction of the arrow G. The lock lever 62 is therefore rotated in the direction of the arrow E₂ to release the locking state to thereby separate the cam pin 30 from the recess 62a formed in the lock lever 62.

At this time, the brake slider 42 coupled to the cam lever 28 through the brake connector 36 and brake switching lever 40 is immediately moved in the direction of the arrow D₁ by the urging force of the first spring 44. Like in the aforementioned stop mode specified by the cam pattern 6, the rollers 46a and 48a of the main brakes 46 and 48 immediately slide the slanted sections 42b and 42c to rotate the main brakes 46 ad 48 in a predetermined direction. Accordingly, the brake shoes 46b and 48b of the main brakes 46 and 48 abut on the outer surfaces of the reel stands 52a and 52b to apply braking thereto.

When the main brakes 46 and 48 are actuated, the reel motor controller 76 stops the reel motor 55 under the control of the system controller 78, thereby stopping the reel stands 52a and 52b.

The pattern for the high-speed tape running mode such as FF/REW is provided at the end portion of the cam grooves for the loading/unloading mode. When the cam gear 12 in high-speed mode (cam pattern 7) is rotated in the direction of the arrow H₂ or in the direction of the unloading mode, therefore, the lock of the cam lever 28 is instantaneously released and braking can be immediately effected. The shaded portion for ON/-OFF of the main brake is where braking can be effected immediately upon lock release.

According to this embodiment, when the tape end signal or stop signal is detected in high-speed mode, the loading motor 14 starts rotating in the direction opposite to the loading direction and the brake slider 42 is immediately moved by releasing the lock of the cam lever 28 caused by the lock lever 62 to thereby permit the main brakes 46 and 48 to brake the reel stands 52a and 52b. It is, therefore, possible to effect braking immediately upon detection of the signal. This can minimize the need to decelerate the running speed of the magnetic tape near the tape end and thus ensure high-speed tape running.

Although, according to this embodiment, braking is effected by the operation of the lock release lever when the tape end is detected by the tape end detectors 84a and 84b, braking may be effected immediately upon occurrence of such an event that the tape T is twisted around a running system in high-speed mode.

What is claimed is:

1. A magnetic tape high-speed braking apparatus comprising:
   tape running drive means including reel stand for rotating a reel, around which a tape is wound, in a predetermined direction;
   brake means for braking said reel stand;
   movable operation mode selecting means having a plurality of independent and successive cams for selecting at least a high speed mode, a stop mode and a normal-speed mode for said tape;
   brake control means, which causes said brake means to be engaged with the cams of said operation mode selecting means, for controlling whether to brake or release said reel stand in accordance with said mode;
   operation mode setting means for driving said operation mode selecting means and setting an operation mode;
   discriminating means for discriminating a running state of said tape and detecting a state in which said tape is to be stopped;
   a lock member, which is driven by the movement of said operation mode setting means due to the setting of said high-speed mode, for locking said brake control means in a brake release position;
   drive means for driving said operation mode selecting means when said discriminating means detects the state in which said tape is to be stopped; and
   brake instantaneous drive means having a lock release member, which is controlled by the movement of said operation mode selecting means, for releasing said brake control means locked by said lock member, thereby braking said reel stand by said brake means.

2. An apparatus according to claim 1, wherein said operation mode selecting means set cams for predetermined a plurality of operation modes in a tape loading state and an unloading state, and that of said plurality of cams which is associated with said high-speed mode is located at an end portion of said plurality of cams.

3. An apparatus according to claim 2, wherein said operation mode selecting means has a groove with different diameters formed to select said predetermined operation modes.

4. An apparatus according to claim 1, wherein said operation mode setting means has a lock release engaging section engageable with said lock release member for actuation thereof.

5. An apparatus according to claim 4, wherein said lock release member includes urging means having one end attached to a fixed end and a flexible member provided between an other end of said urging means and said lock member and engageable with said lock release engaging section.

6. An apparatus according to claim 5, wherein at least in said high-speed mode, said flexible member of said lock release member is pressed by said lock release engaging section when said operation mode selecting means is driven in a predetermined direction, and said urging means is expanded by said lock release engaging section to separate said flexible member from said lock release engaging section to thereby disengage said brake control means from said lock member, when said operation mode selecting means is driven in a direction opposite to said predetermined direction.

7. An apparatus according to claim 1, wherein said brake control means has at one end an engaging section movable by said operation mode selecting means.

8. An apparatus according to claim 7, wherein said brake control means includes:
a brake slider member slidable in a predetermined direction in abutment with said brake member;
a first link portion having one end provided at said brake slider member and rotatable in a predetermined direction;
a second link portion provided at an other end of said first link portion and slidable in a predetermined direction; and
a cam lever member having one end engaged with an other end of said second link portion and an other end at which said engaging section is provided.

9. An apparatus according to claim 6, wherein said operation mode selecting means includes:
a rotatable cam gear;
a drive-force transmitting member, having said lock release engaging section, for rotating said cam gear in a predetermined direction; and
drive means for applying a predetermined drive force to said drive-force transmitting member.

10. An apparatus according to claim 1, wherein said discriminating means comprises tape end detecting means for detecting an end of said tape whereby said reverse means reverse driving of said operation mode setting means when said end of said tape is detected by said tape end detecting means.

11. A magnetic tape high-speed braking apparatus comprising:
tape running drive means including reel stand for rotating a reel, around which a tape is wound, in a predetermined direction;
a brake member for braking said reel stand;
rotatable cam gear means including a first and a second cam patterns having a plurality of independent and successive cams for setting at least a high-speed mode, a stop mode and a normal-speed mode for said tape;
brake control means, which causes said brake member to be engaged with the first cam pattern of said cam gear means, for controlling whether to brake or release said reel stand in accordance with said modes;
operation mode setting means for driving said cam gear means and setting an operation mode;
discriminating means for discriminating a running state of said tape and detecting a state in which said tape is to be stopped;
a lock member having an engaging section which is engaged with the second cam pattern of said cam gear means and driven by the rotation of said cam gear means due to the setting of said high-speed mode, for locking said brake control means in a brake release position;
drive means for driving said cam gear means when said discriminating means detects the state in which said tape is to be stopped; and
a lock release member, which is controlled by the rotation of said cam gear means, for releasing said brake control means locked by said lock member, thereby braking said reel stand by said brake means.

12. An apparatus according to claim 11, wherein said cam gear means set cams for predetermined a plurality of operation modes in a tape loading state and an unloading state, and that of said plurality of cams which is associated with said high-speed mode is located at an end portion of said plurality of first and second cams.

13. An apparatus according to claim 12, wherein said cam gear means has a groove with different diameters formed to set said predetermined operation modes.

14. An apparatus according to claim 11, wherein said drive means has a lock release engaging section engageable with said lock release member for actuation thereof.

15. An apparatus according to claim 14, wherein said lock release member includes urging means having one end attached to a fixed end and a flexible member provided between an other end of said urging means and said lock member and engageable with said lock release engaging section.

16. An apparatus according to claim 15, wherein at least in said high-speed mode, said flexible member of said lock release member is pressed by said lock release engaging section when said cam gear means is driven in a predetermined direction by said drive means, and said urging means is expanded by said lock release engaging section to press said flexible member in a direction away from said other end of said urging means to rotate said lock member in said predetermined direction to thereby disengage said brake control means from said lock member, when said cam gear means is driven in a direction opposite to said predetermined direction.

17. An apparatus according to claim 11, wherein said brake control means has at one end an engaging section movable in accordance with said plurality of first cams of said cam gear means.

18. An apparatus according to claim 17, wherein said brake control means includes:
a brake slider member slidable in a predetermined direction in abutment with said brake member;
a first link portion having one end provided at said brake slider member and rotatable in a predetermined direction;
a second link portion provided at an other end of said first link portion and slidable in a predetermined direction; and
a cam lever member having one end engaged with an other end of said second link portion and an other end at which said engaging section is provided.

19. An apparatus according to claim 16, wherein said drive means includes:

a drive-force transmitting member, having said lock release engaging section, for rotating said cam gear means in a predetermined direction; and a loading motor for applying a predetermined drive force to said drive-force transmitting member.

20. An apparatus according to claim 11, wherein said discriminating means comprises tape end detecting means for detecting an end of said tape whereby said reverse means reverses driving of said drive means when said end of said tape is detected by said tape end detecting means.

* * * * *